H. J. GILBERT.
BUSHING.
APPLICATION FILED FEB. 8, 1904.
910,526.
Patented Jan. 26, 1909.
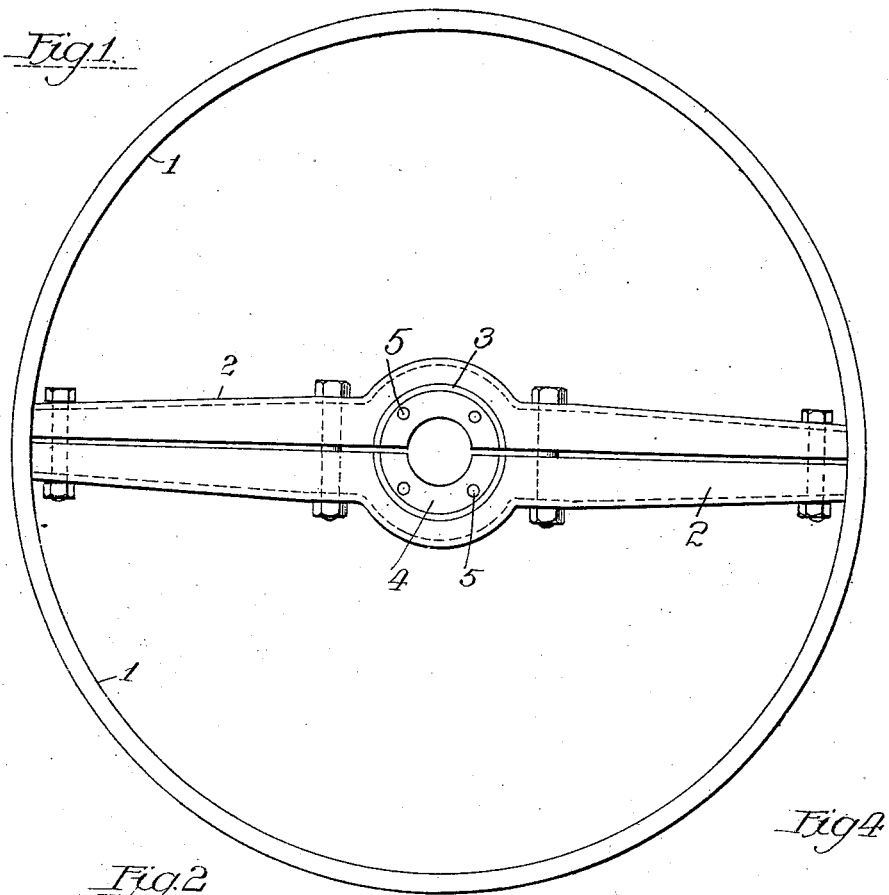
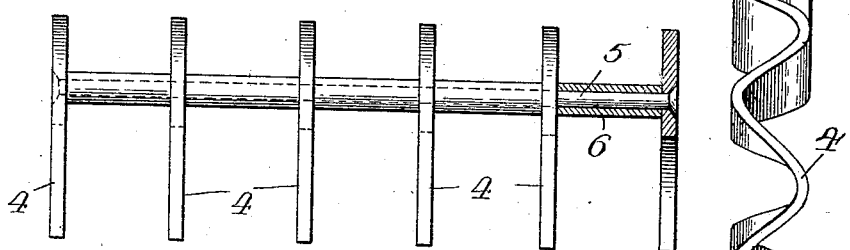
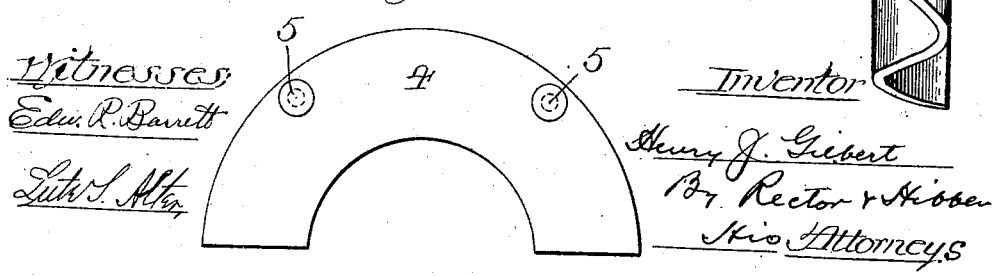
Witnesses
Edw. P. Barrett
Luth S. Alt
Inventor
Henry J. Gilbert
By Rector & Hibber
His Attorneys

UNITED STATES PATENT OFFICE.

HENRY J. GILBERT, OF SAGINAW, MICHIGAN.

BUSHING.

No. 910,526.   Specification of Letters Patent.   Patented Jan. 26, 1909.

Application filed February 3, 1904.   Serial No. 192,699.

*To all whom it may concern:*

Be it known that I, HENRY J. GILBERT, a citizen of the United States, residing at Saginaw, Saginaw county, Michigan, have invented certain new and useful Improvements in Bushings, of which the following is a specification.

My invention relates to bushings generally, being particularly applicable to and useful in connection with pulleys and the like, and the object of my invention is to provide an interchangeable bushing which shall be simple and efficient as well as light and durable.

The points of advantage and utility in my novel form of bushing will be understood from the description hereinafter given.

In the drawing, Figure 1 is a side elevation of a sheet metal pulley to which my improved bushing has been applied; Fig. 2 a side elevation (partly in section) of my bushing; Fig. 3 an end elevation of such bushing; and Fig. 4 a view of a modified form of the disk portion of my bushing.

The same letters of reference are used to indicate identical parts in the several views.

For convenience in illustration and description of my invention I have chosen to show and describe my bushing in connection with a sheet metal pulley, as indicated in Fig. 1, and as such pulley forms no part of my present invention no description thereof is required except to say that such pulley is, in the present instance, a split pulley comprising the two rim segments 1, and spoke arms 2 which are correspondingly expanded at their central portion to form the usual shaft opening, within which my bushing is arranged. This shaft opening may be provided, if desired, with a hub thimble 3, but this is not essential.

As herein shown, my bushing is made in two portions or halves, each half consisting, as illustrated in Fig. 2, of a series of sheet metal rings 4 which are by preference arranged at right angles to the shaft (and to the axis of rotation), with their inner edges bearing on the shaft and their outer edges against the hub structure, or, as in the present instance, against the hub thimble 3 hereinbefore referred to. These rings, which are of slightly less extent than a semi-circle, are arranged parallel to each other as indicated and are adapted to be held a suitable or desired distance apart. To this end these rings are held together in such proper relative arrangement by a rod or rods 5 (preferably two as shown), passing through holes in the rings. On these rods and between the rings are strung or inserted small distance tubes or sleeves 6, with the result that the rings are spaced along the rods 5 at any distance apart according to the length of the distance sleeves. The ends of the rods may be secured to the end rings in any desired manner, and as a suitable method I have shown such ends as riveted to the end rings.

While I have herein illustrated a series of six of these rings, yet it will be understood that a greater or less number thereof may be employed, depending on the width of the pulley hub and thimble. Moreover, the rings need not necessarily be flat, as shown in Fig. 2, but may be corrugated as illustrated in Fig. 4, to obtain greater strength.

Two of the half bushings made as above described, when inserted in the shaft openings of the pulley as indicated, provide a simple and comparatively inexpensive but nevertheless strong and durable bushing. The bushings constructed as above described are interchangeable by being made in different sizes as regards their shaft openings, whereby a pulley of the standard or any given shaft bore or opening may be applied to shafts of varying diameters less than such shaft opening.

I have herein described my bushing in connection with a pulley of the split type and consequently such bushing has likewise been described and illustrated as made in two halves, but it will be understood that I do not limit myself to such split type of bushing, and hence when I speak of rings in the claims I contemplate both entire rings and half rings.

It will be understood that various mechanical changes may be made in respect to the form and construction illustrated and described without departing from the spirit and scope of my invention and claims.

I claim:

1. A bushing comprising a series of separate metal rings having bearing surfaces on their inner and outer edges and arranged parallel to each other with intervening spaces, and means for holding the rings in position; substantially as described.

2. A bushing comprising a series of rings having bearing surfaces on their inner and outer edges and arranged at right angles to the axis of rotation and means for holding the rings in position; substantially as described.

3. A bushing comprising a series of separate metal rings, and means for holding such rings in proper relative position; substantially as described.

4. A bushing comprising a series of sheet metal rings with their inner edges arranged to be presented to the shaft, and means for holding such rings in proper relative position; substantially as described.

5. A bushing comprising a series of sheet metal rings arranged parallel to each other, and means for holding such rings in proper relative position; substantially as described.

6. A bushing comprising a series of sheet metal rings arranged parallel to each other, means for distancing said rings, and means for holding such rings in said relation; substantially as described.

7. A bushing comprising a series of sheet metal rings arranged parallel to each other, and rods passing through said rings and secured to the end rings; substantially as described.

8. A bushing comprising a series of sheet metal rings arranged parallel to each other, rods passing through said rings, and distance sleeves arranged between the rings; substantially as described.

9. A bushing comprising a series of sheet metal rings, rods passing transversely through such rings, and distance sleeves strung on the rods between the rings; substantially as described.

10. A bushing comprising a series of rings, having bearing surfaces on their inner and outer edges, and rods passing transversely through such rings intermediate their edges; substantially as described.

11. A bushing comprising a series of flat sheet metal rings having bearing surfaces on their inner and outer edges, and means for holding the rings in position; substantially as described.

12. A bushing comprising a series of substantially semi-circular rings having bearing surfaces on their inner and outer edges, and means for holding the rings in position; substantially as described.

13. A bushing comprising a series of substantially semi-circular rings having bearing surfaces on their inner and outer edges, a pair of parallel rods passing transversely through the rings, and distance sleeves strung on the rods for spacing or distancing said rings; substantially as described.

HENRY J. GILBERT.

Witnesses:
S. E. HIBBEN,
LOUIS B. ERWIN.